(12) United States Patent
Hull et al.

(10) Patent No.: US 11,060,844 B2
(45) Date of Patent: Jul. 13, 2021

(54) EDGE FEATURE MEASUREMENT

(71) Applicant: The Boeing Company, Chicago, IL (US)

(72) Inventors: Jerald A. Hull, Charleston, SC (US);
Jiaqin Liu, Charleston, SC (US);
Stuart G. Lambert, Charleston, SC (US)

(73) Assignee: THE BOEING COMPANY, Austin, TX (US)

(*) Notice: Subject to any disclaimer, the term of this patent is extended or adjusted under 35 U.S.C. 154(b) by 932 days.

(21) Appl. No.: 14/951,450

(22) Filed: Nov. 24, 2015

(65) Prior Publication Data

US 2017/0148149 A1 May 25, 2017

(51) Int. Cl.
*G01B 11/03* (2006.01)
*G01B 11/24* (2006.01)
*H04N 5/225* (2006.01)

(52) U.S. Cl.
CPC .............. *G01B 11/03* (2013.01); *G01B 11/24* (2013.01); *H04N 5/2251* (2013.01); *H04N 5/2257* (2013.01)

(58) Field of Classification Search
USPC ........................................................ 348/136
See application file for complete search history.

(56) References Cited

U.S. PATENT DOCUMENTS

| 4,440,496 | A | 4/1984 | Milana |
| 4,922,622 | A * | 5/1990 | Galloway ............. G01B 3/02 33/542 |
| 4,967,092 | A | 10/1990 | Fraignier et al. |
| 5,933,231 | A * | 8/1999 | Bieman ............. G01B 11/12 356/241.1 |
| 6,879,404 | B2 | 4/2005 | Jagiella et al. |
| 7,243,553 | B2 | 7/2007 | Jagiella et al. |
| 2005/0068544 | A1* | 3/2005 | Doemens ............ A61B 5/0064 356/601 |

FOREIGN PATENT DOCUMENTS

CN    2020 18276 U    10/2011

OTHER PUBLICATIONS

Spacek, Omnidirectional Catadioptric Vision Sensor with Conical Mirrors, Department of Computer Science—University of Essex, Colchester, CO4 3SQ, UK, Jul. 2001.

* cited by examiner

*Primary Examiner* — Mikhail Itskovich
(74) *Attorney, Agent, or Firm* — Moore IP Law

(57) ABSTRACT

An apparatus for measuring edge features of a work piece includes an optical sensor assembly and a reference device. The reference device includes a contact surface configured to contact a surface of the work piece adjacent to an edge of the work piece and a marked surface including a plurality of markings indicating positions relative to the contact surface. The reference device is configured to be coupled to a portion of the optical sensor assembly such that the optical sensor assembly is positioned to capture an image representing a portion of the marked surface and an edge feature of the work piece.

22 Claims, 11 Drawing Sheets

EDGE FEATURE MEASUREMENT

FIELD OF THE DISCLOSURE

The present disclosure is generally related to measuring edge features of a work piece.

BACKGROUND

Many manufacturing operations involve drilling, cutting, and other machining operations. For example, during manufacturing of a single commercial aircraft, millions of holes may be drilled through various materials and combinations of materials. Such machining operations can leave undesirable edge features, such as burrs and tear out. Cutting and milling operations can produce similar undesirable edge features.

Generally, smaller edge features are preferred to larger edge features, as larger edge features tend to be associated with increased risk of fatigue cracking. Accordingly, some manufacturing operations use edge feature size as a quality metric. For example, a particular manufacturing step may be associated with a maximum acceptable burr size. However, edge feature sizes can be difficult to measure. For example, measuring a burr may involve delicate and time consuming manual manipulation of a flushness gauge with a flat bottom stylus around a bore exit perimeter to find a peak burr height measurement and manually capturing the measured value. This burr height measurement technique involves physical contact between the measured burr and the flat bottom stylus. Since the burr may be quite thin, this contact can deform the burr, thereby slightly changing its height, resulting in non-repeatable measurements. Additionally, this measurement technique is error prone since measurements can vary depending on how firmly a technician presses the flushness gauge against the surrounding surface of the work piece.

Using dull cutting tools, such as rotary cutters, generally causes larger edge features. Accordingly, to avoid or reduce concerns associated with measuring edge features, some manufacturers only use cutters that are expected to be sharp enough to create edge features that are smaller than a maximum acceptable edge feature size. Thus, after a cutting tool is used a particular number of times, the cutting tool may be assumed to be too dull to create edge features smaller than the maximum acceptable edge feature size and may be discarded, leading to increased costs.

SUMMARY

In a particular embodiment, an apparatus for measuring edge features of a work piece includes an optical sensor assembly and a reference device. The reference device has a contact surface configured to contact a surface of the work piece adjacent to an edge of the work piece and a marked surface including a plurality of markings indicating positions relative to the contact surface. The reference device is configured to be coupled to a portion of the optical sensor assembly such that the optical sensor assembly is positioned to capture an image representing a portion of the marked surface and an edge feature of the work piece.

In another particular embodiment, a reference device for measuring edge features of a work piece includes a contact surface configured to contact a surface of the work piece adjacent to an edge of the work piece and a marked surface including a plurality of markings indicating positions relative to the contact surface. The reference device also includes an alignment portion configured to be coupled to a portion of an optical sensor assembly such that the optical sensor assembly is positioned to capture an image representing a portion of the marked surface and an edge feature of the work piece.

In another particular embodiment, a method of measuring an edge feature of a work piece includes obtaining image data representing the edge feature of the work piece and a portion of a marked surface of a reference device, where the reference device includes a contact surface configured to contact a surface of the work piece while the image data is captured. The method also includes detecting, in the image data, particular markings of a plurality of markings on the marked surface, where the particular markings indicate a position relative to the contact surface. The method also includes determining a measurement associated with the edge feature based on the particular markings.

The features, functions, and advantages described herein can be achieved independently in various embodiments or may be combined in other embodiments, further details of which are disclosed with reference to the following description and drawings.

DETAILED DESCRIPTION

Systems and methods disclosed herein enable in situ measurement of edge features. For example, edge features can be measured immediately after a machining operation is performed on a work piece. Such edge feature measurements can be used to verify the machining operation satisfies a quality metric. For example, an edge feature measurement can be compared to a threshold, e.g., an allowable tolerance value associated with an edge feature size. If the edge feature measurement fails to satisfy the quality metric, an operator or control system may be alerted.

Additionally, the disclosed systems and methods produce repeatable edge feature measurements enabling automation (e.g., performed by and processed by a computer controlled system). An edge feature measurement can be determined based on image data showing the edge feature and a measurement scale, potentially simplifying recordkeeping associated with the edge feature measurements. Since the edge feature measurements can be performed each time a machining operation is performed, a cutting tool may be replaced when it ceases to provide acceptable quality edge features (rather than after the cutting tool has been used to perform a particular number of machining operations), which may reduce a frequency with which cutting tools are replaced, thereby reducing costs associated with the manufacturing operation.

Further, in some implementations, edge feature measurement operations are combined with (e.g., performed concurrently with) other quality check operations regularly performed by a manufacturer. For example, after a drilling operation, a manufacturer may use a bore probe to check the diameter of a drilled hole, roundness of the drilled hole, depth of the drilled hole, or thickness of the work piece. In this example, an edge feature measurement system is configured to be integrated with or coupled to the bore probe, thereby enabling concurrent measurement of the edge features associated with the hole as well as other features checked by the bore probe. Thus, when combined with other quality check operations that are performed during a manufacturing operation, measuring the edge features using the disclosed systems and methods may be performed with little incremental cost or delay.

Figure 1:
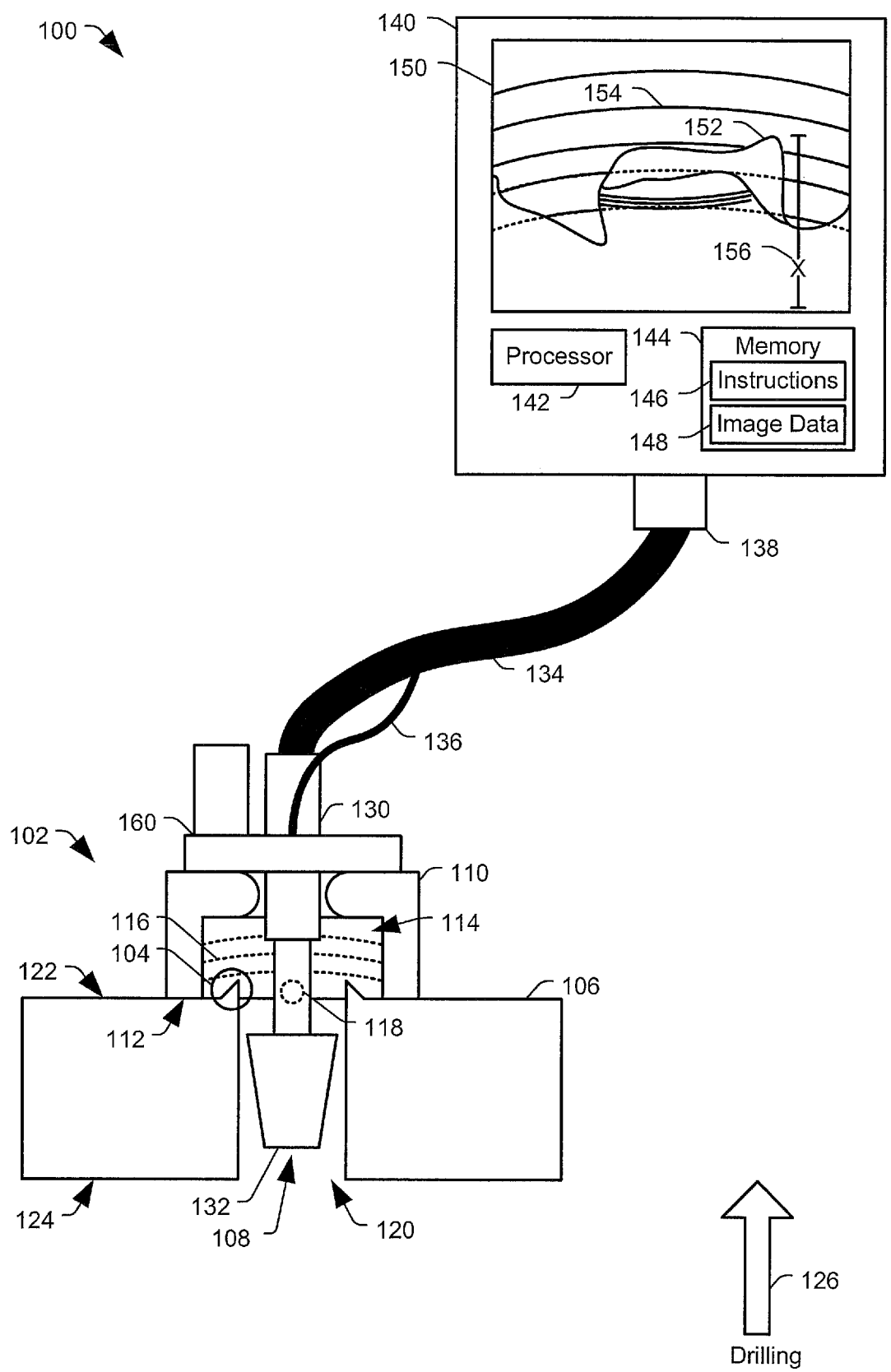
FIG. 1 is a diagram illustrating a first example of system for measuring an edge feature of a work piece.

FIG. 1 is a diagram illustrating a first example of a system 100 for measuring an edge feature 104 or edge features of a work piece 106. In FIG. 1, portions of the apparatus 102 are schematically illustrated in a cross-sectional view. The apparatus 102 includes an optical sensor assembly 108 and a reference device 110. The edge feature 104 may include or correspond to a burr, tear out, or another artifact of machining the work piece 106. In the example illustrated in FIG. 1, a hole 120 has been drilled in the work piece 106 in a drilling direction 126, and the edge feature 104 is on an exit side of the hole 120 (e.g., the edge feature 104 is an exit burr). Although not specifically illustrated in FIG. 1, the apparatus 102 can also, or in the alternative, be used to measure an edge feature on an entrance side 124 of the hole 120. In other examples, the apparatus 102 can be used to measure an edge feature formed by a different machining operation than drilling, such as an edge feature formed by a milling operation or a cutting operation.

The reference device 110 includes a contact surface 112 configured to contact a surface 122 of the work piece 106 adjacent to an edge of the work piece 106. The contact surface 112 may be substantially planer or may be curved in a manner that provides stable, repeatable contact between the contact surface 112 and the surface 122 of the work piece 106. To illustrate, if the surface 122 of the work piece 106 is curved, the contact surface 112 may have a complementary curve.

The reference device 110 also includes a marked surface 114 including a plurality of markings 116 indicating positions relative to the contact surface 112. For example, the markings 116 may indicate distances to the contact surface 112. Additionally, or in the alternative, the markings 116 may indicate angular positions around the marked surface 114 (e.g., relative to a reference position). The markings 116 may include computer-readable information. To illustrate, as described further with reference to FIG. 3B, the markings 116 may include gray code markings. The marked surface 114 may be formed of or coated with a material that provides a strong optical contrast with a material of the work piece 106. The marked surface 114 may be etched, engraved, stamped, or otherwise formed in material of the reference device 110. Alternatively, the marked surface 114 may be formed as a separate layer, such as a metal foil layer or a polymer layer, subsequently affixed to the reference device 110.

In the particular example illustrated in FIG. 1, the reference device 110 includes one or more walls defining a cavity, and the marked surface 114 corresponds to an interior wall of the cavity. The cavity is sized to enclose a region of the work piece 106 including the edge of the work piece 106. To illustrate, in FIG. 1, the cavity of the reference device 110 entirely surrounds (e.g., encloses) an edge of the hole 120 at a distance sufficient to avoid contact between the reference device 110 and the edge features 104. In some implementations, a larger reference device (or a reference device having a larger cavity) may be used to measure edge features associated with a larger hole, and a smaller reference device (or a reference device having a smaller cavity) may be used to measure edge features associated with a smaller hole. In other examples, such as when the edge is elongated (e.g., a straight edge associated with a cut), the reference device 110, or a portion of the reference device 110 including the marked surface 114, may be elongated. To illustrate, to measure edge features of a straight cut, the marked surface 114 may be straight and may have a length sufficient to provide a background in an image of the edge features of a straight cut.

The optical sensor assembly 108 includes a sensor 118 to capture image data. In various examples, the sensor 118 includes a complementary metal-oxide semiconductor (CMOS) image sensor, a semiconductor charge-coupled device (CCD) sensor, an N-type metal-oxide semiconductor (NMOS) image sensor, another optical image sensor, or a combination thereof. The optical sensor assembly 108 also includes optics, such as one or more lenses, light sources, mirrors, or other optical devices, as described in more detail with reference to FIGS. 4 and 5. The optical sensor assembly 108 also includes an interface 138 to provide image data captured by the sensor 118 to a computing device 140.

The optical sensor assembly 108 is coupled to or housed within a housing 130, such as a shaft, that facilitates positioning of the sensor 118 adjacent to the edge. In some implementations, the housing includes or is coupled to another device that is configured to perform another quality control measurement or test. Examples of a device that the optical sensor assembly 108 may be coupled to or integrated with include a bore gauge 132, a depth gauge, a bore roundness gauge, or a mechanical, electrical, acoustic or optical sensor. In such implementations, the edge feature 104 can be measured during an operation that also measures other features of the work piece 106. For example, the housing 130 can be inserted into the hole 120 to measure the edge features 104 and to determine a depth of the hole 120, a thickness of the work piece 106, etc.

The reference device 110 is configured to couple to a portion of the optical sensor assembly 108 such that the optical sensor assembly 108 is positioned to capture an image representing a portion of the marked surface 114 and representing the edge feature 104 of the work piece 106. In the example illustrated in FIG. 1, a rotary stage 160 is coupled to the housing 130, and the housing 130 extends through an opening in the reference device 110. In this example, a portion of the rotary stage 160 contacts an upper portion (e.g., a top surface) of the reference device 110 to act as a stop to align the sensor 118 such that an image captured by the sensor 118 is approximately even with or includes the edge features 104. For example, the sensor 118 may be positioned so that it captures an image approximately level with the contact surface 112 of the reference device 110.

Figure 4:
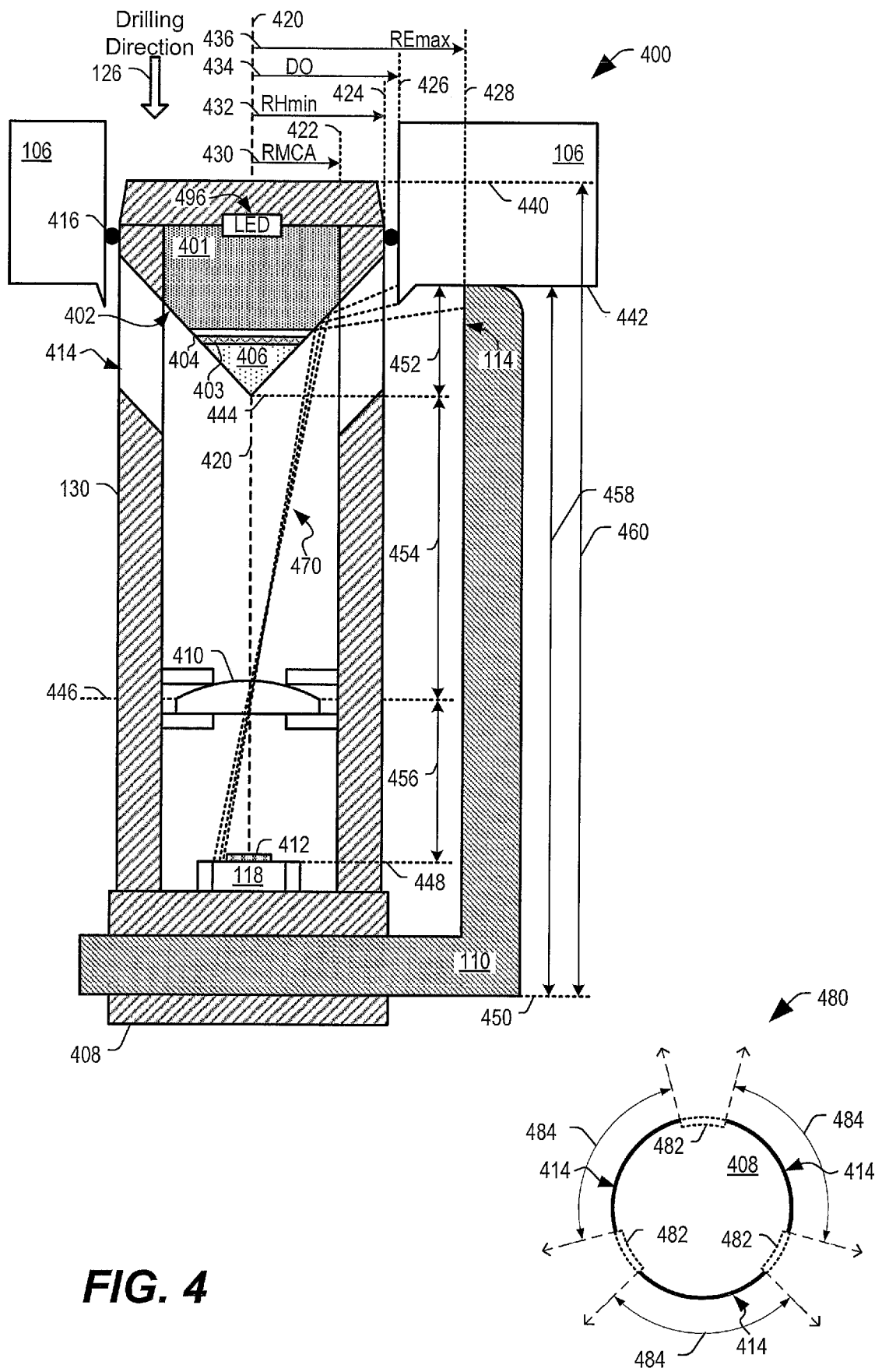
FIG. 4 is a diagram illustrating a third example of system for measuring an edge feature of a work piece.
Figure 5:
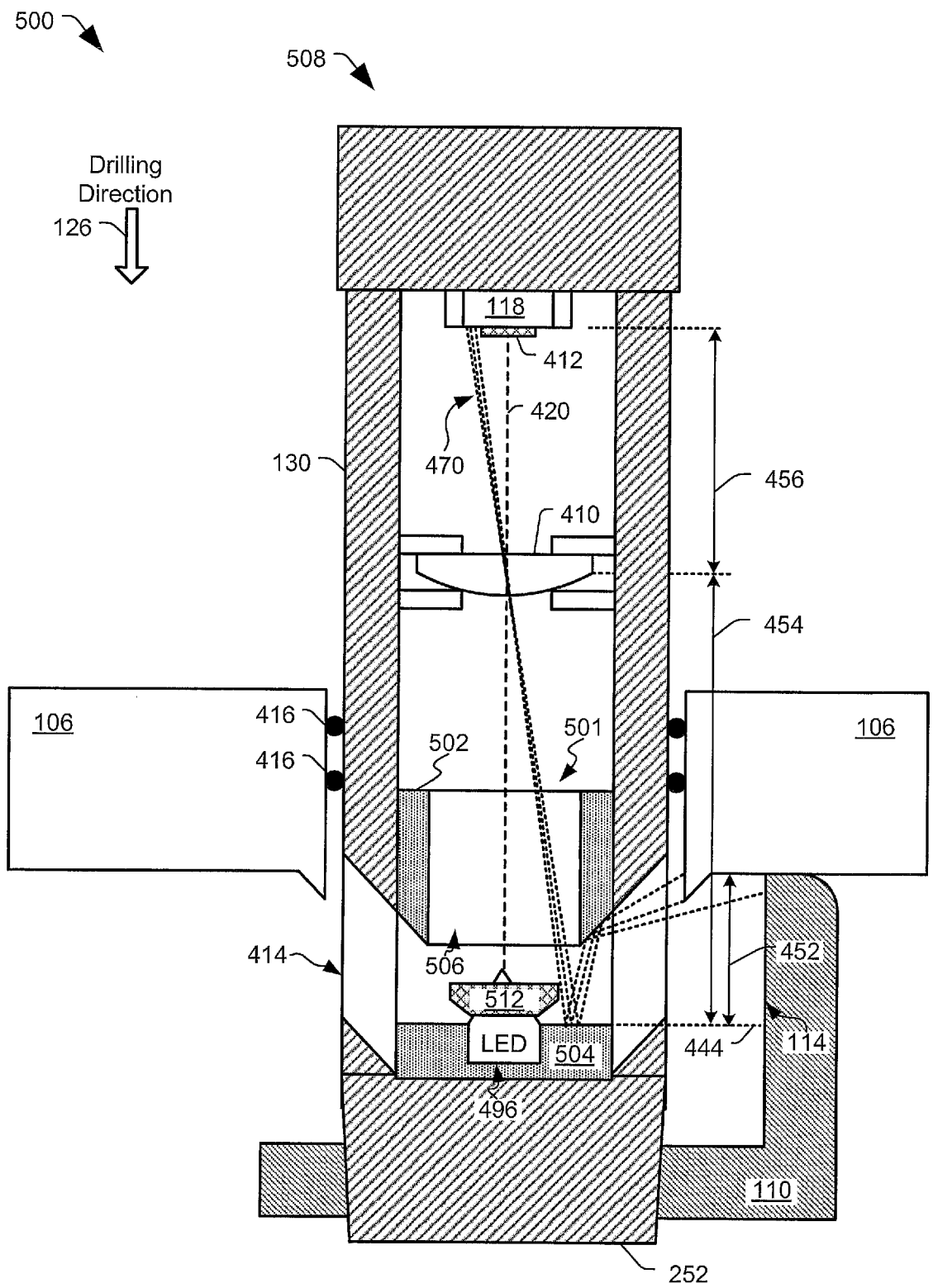
FIG. 5 is a diagram illustrating a fourth example of system for measuring an edge feature of a work piece.

In the example illustrated in FIG. 1, the sensor 118 has a limited field of view. For example, the sensor 118 may capture an image having between about a 10 degree field of view and a 180 degree field of view. The rotary stage 160 is configured to rotate at least a portion of the optical sensor assembly 108 to capture images representing the edge features 104 at multiple angular positions on the work piece 106. For example, the rotary stage 160 may rotate the housing 130 such that the sensor 118 is able to capture images 360 degrees around the hole 120. FIGS. 4 and 5 illustrate other examples of optical sensor assemblies configured to capture a single image having a 360 degree field of view representing the edge features 104 at multiple angular positions on the work piece 106.

The interface 138 of the optical sensor assembly 108 is coupled to the sensor 118 via a communication medium, such as one or more optical fibers 134 (e.g., a fiber bundle) or via one or more conductors (e.g., a wire bundle). The interface 138 is configured to provide image data captured by the sensor 118 to the computing device 140. The computing device 140 includes a processor 142 and a memory 144 that is accessible to the processor 142. The computing device 140 may also include or may be coupled to a display device 150. The memory 144 is configured to store the image data 148 received from the optical sensor assembly 108. Additionally, the memory 144 may store instructions 146 that are executable by the processor 142 to analyze the image data 148, to generate alerts or notifications based on the image data 148 (or based on other measurements performed by the apparatus 102), to generate a visual display output at the display device 150, or a combination thereof. In some examples, the instructions 146 cause the processor 142 to generate a display output at the display device 150 showing an edge feature 104 (or edge features) of the work piece 106. To illustrate, the display device 150 may present a real-time or near real-time image that includes a representation 152 of the edge feature 104. Image data presented at the display device 150 may also represent at least a portion of the marked surface 114. For example, the image data presented at the display device 150 may include the representation 154 of one or more markings of the marked surface 114. The edge feature 104 may obscure one or more of the markings 116 from the perspective of the sensor 118. Accordingly, in the image data presented at the display device 150 one more of the markings 116 that are obscured by the edge feature 104 may partially or fully hidden (as indicated by dashed lines in FIG. 1).

The instructions 146 may also be executable by the processor 142 to analyze the image data 148 to generate a measurement of the edge feature 104. For example, the processor 142 may determine a height (e.g., a peak or average height) of the edge feature 104. An indication 156 of the height may be output via the display device 150. As another example, the height of the edge feature 104 may be compared to a threshold to determine whether the edge feature 104 satisfies a quality criterion. If the height of the edge feature 104 exceeds the threshold, the processor 142 may generate an alert to notify an operator or an automated system that the edge feature 104 does not satisfy the quality criterion. To illustrate, the alert includes an electronic signal, an electronic message (e.g., an email message), an audible signal, or a visual signal (e.g., a color code applied to the indication 156 of the height), or a combination thereof. In response to the alert, the operator or the automated system may perform additional measurements (e.g., to verify the height measurement), corrective actions (e.g., reworking or scrapping the work piece 106), a preventative action (e.g., replacing or sharpening a cutting tool that formed the edge feature 104), or a combination thereof.

In operation, after a machining operation, such as drilling the hole 120 in the work piece 106, the apparatus 102 may be used to measure edge features formed by the machining operation, and possibly to perform other measurements or quality checks. For example, the reference device 110 is configured to be positioned on the work piece 106 so the contact surface 112 of the reference device 110 is in contact with the surface 122 of the work piece 106. In some implementations, the measurements are performed while the work piece 106 remains at a work station associated with the machining operation. To illustrate, immediately after the hole 120 is drilled and the drill bit is removed, the apparatus 102 may be used to perform measurements before the work piece 106 is moved to a subsequent work station.

The optical sensor assembly 108 is configured to be positioned in the hole 120 so the sensor 118 may capture an image of at least a portion of the marked surface 114 and the edge feature 104. A light source (such as an illumination fiber 136) of the optical sensor assembly 108 provides illumination to capture the image. If the sensor 118 has less than a 360 degree field of view, the optical sensor assembly 108 may be rotated (e.g., using the rotary stage 160) to enable the sensor 118 to capture multiple images of the edge feature 104 such that the multiple images together cover 360 degrees around the hole 120.

While the reference device 110 is being moved into contact with the work piece 106 or while the reference device 110 is in contact with the work piece 106, additional measurements or quality checks may be performed. For example, the bore gauge 132 may be used to check a diameter of the hole 120.

The image data 148 captured by the sensor 118 may be provided to the computing device 140. The computing device 140 may store the image data 148 at the memory 144 and may process the image data 148 to generate a measurement of the edge feature 104. The computing device 140 may also generate an output depicting the edge feature 104 (e.g., includes the representation 152), depicting one or more of the markings 116 (e.g., includes the representation 154), including an indication 156 of the height of the edge feature 104, an alert, or a combination thereof. Since the computing device 140 generates the output in real-time or near real-time, equipment that performed the machining operation that generated the edge feature 104 may be proximate to the work piece 106 when the computing device 140 outputs the indication 156 of the height of the edge feature 104. Thus, the equipment may be used to rework the work piece 106 if needed. Alternatively, the equipment can be serviced (e.g., a cutter that formed the edge feature 104 may be replaced or sharpened).

Since the edge feature measurements are performed in a manner not involving physical contact with the edge feature 104, the edge feature measurements are repeatable (e.g., to enable verification of measurements). Additionally, the edge feature measurements can be archived for later reference since the measurements are based on the image data 148. The edge feature measurements can also be automated (e.g., performed by and processed by a computer controlled system) by coupling the optical sensor assembly 108, the reference device 110, or both, to the computer controlled system, such as a robotic arm. By automating and improving edge feature measurement, the apparatus 102 can be used to reduce the frequency with which cutting tools are replaced with little incremental cost or delay, as explained above.

Figure 2:
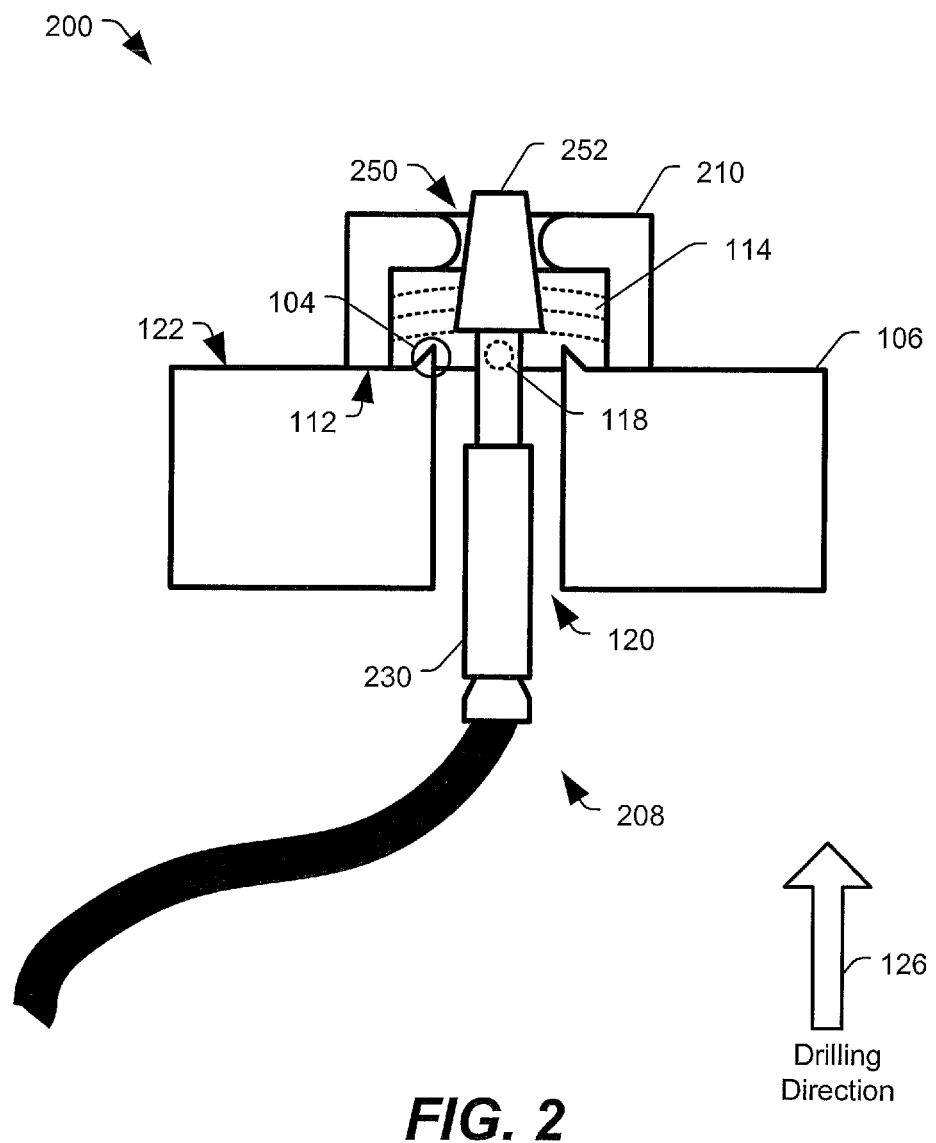
FIG. 2 is a diagram illustrating a second example of system for measuring an edge feature of a work piece.

FIG. 2 is a diagram illustrating an example of a system 200 for measuring the edge feature 104 or edge features of the work piece 106. In FIG. 2, portions of the system 200 are schematically illustrated in a cross-sectional view. The system 200 is similar to the system 100 of FIG. 1 in general features and operation. In the example of FIG. 1, the optical sensor assembly 108 is configured to be inserted into the hole 120 from the back side of the work piece 106 relative to the drilling direction 126. In contrast, in the example of FIG. 2, the system 200 includes an optical sensor assembly 208 configured to be inserted into the hole 120 from the front side of the work piece 106 relative to the drilling direction 126.

In the example of FIG. 2, the optical sensor assembly 208 is coupled to or housed within a housing 230, such as a shaft, that facilitates positioning of the sensor 118 adjacent to the edge. In some implementations, the housing includes or is coupled to another device configured to perform another quality control measurement or test, as described with reference to FIG. 1. A reference device 210 is configured to be coupled to a portion of the optical sensor assembly 208 such that the optical sensor assembly 208 is positioned to capture an image representing a portion of the marked surface 114 of the reference device 210 and representing the edge feature 104 of the work piece 106. For example, an alignment portion 250 of the reference device 210 may be configured to receive an alignment pin 252 of the optical sensor assembly 208. When the alignment pin 252 is seated in the alignment portion 250 of the reference device 210 and the contact surface 112 of the reference device 210 is in contact with the surface 122 of the work piece 106, the sensor 118 is positioned so it captures an image approximately level with the contact surface 112 of the reference device 210. In some implementations, the sensor 118 or a mirror or lens associated with the sensor 118 may be moveable along the housing 230 to facilitate alignment of the sensor 118 with the edge of the hole 120 (e.g., based on thickness of the work piece 106).

The system 200 may include other features or components not specifically illustrated in FIG. 2. For example, the system 200 may include a rotary stage, such as the rotary stage 160, coupled to the housing 230. As another example, the system 200 may include the interface 138, the computing device 140, the display device 150, other features or components of the system 100 of FIG. 1, or a combination thereof.

In some manufacturing operations, the drilling may be performed using automated equipment or using a stationary drill (such as a drill press, as opposed to a hand-held drill). In such manufacturing operations, it may be easier to automate edge feature measurements using the optical sensor assembly 208 (as opposed to the optical sensor assembly 108) because a work station that performs the drilling is configured to move in the drilling direction 126 rather than against the drilling direction 126. For example, when a drill mounted on a robotic arm is used to drill the hole 120, the robotic arm may be configured to move in the drilling direction 126. In this example, reconfiguring the robotic arm between a drilling operation and an edge feature measurement operation to enable the robotic arm to move against the drilling direction 126 (e.g., to insert the optical sensor assembly 108 from the back side of the work piece 106) may be complicated or time consuming. Thus, edge feature measurement can be simplified by using an optical sensor assembly, such as the optical sensor assembly 208, that can be inserted into the hole 120 from the front side of the work piece (e.g., in the drilling direction 126).

Figure 3A:
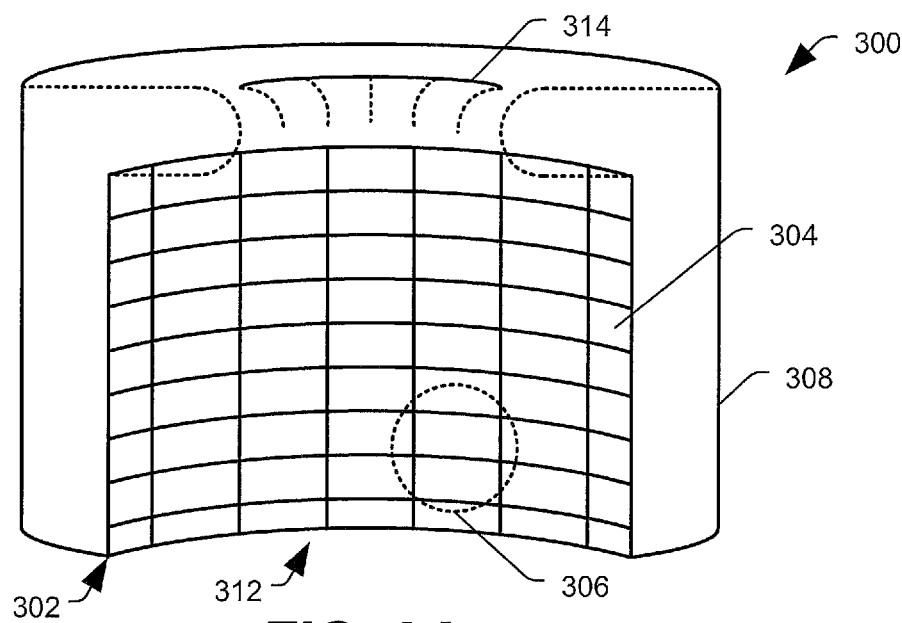
FIG. 3A is a diagram illustrating a first example of a reference device.
Figure 3B:
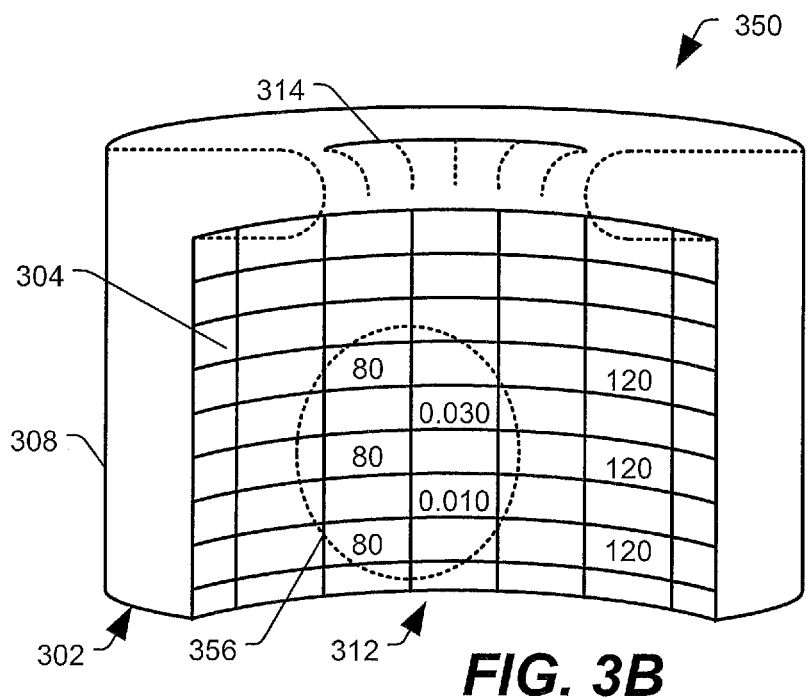
FIG. 3B is a diagram illustrating a second example of a reference device.

FIG. 3A is a diagram illustrating a first example of a reference device 300, and FIG. 3B is a diagram illustrating a second example of a reference device 350. The reference device 110 of FIG. 1 may include or correspond to the reference device 300 of FIG. 3A or the reference device 350 of FIG. 3B. Similarly, the reference device 210 of FIG. 2 may include or correspond to the reference device 300 of FIG. 3A or the reference device 350 of FIG. 3B. In FIGS. 3A and 3B, the reference devices 300 and 350 are illustrated in a cross-sectional view.

The reference devices 300 and 350 each include one or more walls 308 defining a cavity 312. The reference devices 300 and 350 also each include a contact surface 302 on a bottom portion, and an alignment portion 314 on a top portion. The alignment portion 314 is configured to couple to a portion of an optical sensor assembly (such as the optical sensor assembly 108 of FIG. 1, or the optical sensor assembly 208 of FIG. 2) such that the optical sensor assembly is positioned to capture an image representing an edge feature of the work piece and a portion of a marked surface 304 of the respective reference device 300, 350. The contact surface 302 is configured to contact a surface of the work piece adjacent to the edge.

The reference devices 300 and 350 each include markings on the marked surface 304. Markings 306 of the reference device 300 represent a two dimensional grid of lines wrapped around the inner surface of the cavity 312. The markings 306 are graduated (e.g., spaced apart) or annotated (e.g., using a color code, line widths, text, etc.) in a manner enabling determination of a distance from a particular marking to the contact surface 302. The markings 306 may also be graduated (e.g., spaced apart) or annotated (e.g., using a color code, line widths, text, etc.) in a manner enabling determination of an angular position of a particular marking around a perimeter of the marked surface 304.

Markings 356 of the reference device 350 represent a two dimensional code (e.g., a gray code) wrapped around the inner surface of the cavity 312. Rows of entries of the code may be spaced apart (and may be further annotated using a color code, etc.) in a manner that enables determination of a distance from a particular entry of the code to the contact surface 302. For example, when the code includes numerals, a distance from a bottom edge of a particular row of numerals may be indicated by the code. Further, a font size (e.g., a height) of each numeral and a spacing between rows of numerals may be known, such that a measurement of an edge feature can be determined based on a relative position of a top of the edge feature and a particular row of the code.

Additionally, the code may indicate an angular position of a particular entry around a perimeter of the marked surface 304 of the reference device 350. For example, columns of entries of the code may be spaced apart (and may be further annotated using a color code, etc.) in a manner that enables determination of the angular position. To illustrate, when the code includes numerals, an angular distance from an edge of a numeral of a particular entry to a zero angle or reference angle may be indicated by the code. Further, a font size (e.g., a width) of each numeral, a spacing between numerals, and a spacing between columns may be known, such that a measurement of an angular position of an edge feature can be determined based on a relative position of the edge feature and a particular column of the code.

FIG. 4 is a diagram illustrating an example of a system 400 for measuring an edge feature of the work piece 106. The system 400 includes the reference device 110 and an optical sensor assembly 408. FIG. 4 also illustrates a plan view 480 of the optical sensor assembly 408. The optical sensor assembly 408 of FIG. 4 is configured to be inserted into the work piece 106 from the back side of the work piece 106 relative to the drilling direction 126.

The optical sensor assembly 408 is configured to capture a single image with a multidirectional field of view (e.g., a 360 degree field of view or a nearly 360 degree field of view with small portions obscured by support members 482) of the edge features of the work piece 106. For example, in the plan view 480, the optical sensor assembly 408 includes multiple support members 482 between openings 414. The openings 414 are each associated with a field of view 484. Although each of the fields of view 484 is less than 360 degrees, depending on the width of the support members 482, the combined field of view of the optical sensor assembly 408 may approach 360 degrees. Although FIG. 4 shows three support members 482 and three openings 414, in other embodiments, more than three or fewer than three support members 482 may be used, resulting in more than three or fewer than three openings 414.

In the example illustrated in FIG. 4, the optical sensor assembly 408 includes the sensor 118 at one end and a cone-shaped optical element 401 at the other end. The cone-shaped optical element 401 includes a reflective surface 402, a clear portion 404, and an opaque portion 406. The cone-shaped optical element 401 may also include an annular shade 403. A light source 496, such as a light emitting diode (LED), is positioned behind the cone-shaped optical element 401. A body of the cone-shaped optical element 401 may be substantially optically transparent such that light from the light source 496 can propagate through the body and be emitted at the clear portion 404 to illuminate the edge feature and at least a portion of the marked surface 114.

As described above, the housing 130 of the optical sensor assembly 408 may include the openings 414 spaced apart around the housing 130. In a particular embodiment, the openings 414 may be filled with a transparent material. Alternately, in an embodiment, the transparent material may form the support members 482 and may form a ring around the entire housing 130 (e.g., a transparent ring). In this embodiment, the transparent ring replaces the support members 482 and fills the openings 414. Accordingly, an end of the optical sensor assembly 408 including the cone-shaped optical element 401 may be coupled to an end of the optical sensor assembly 408 including the sensor 118 with no opaque support members present, providing an unimpeded 360 degree field of view.

Figure 6:
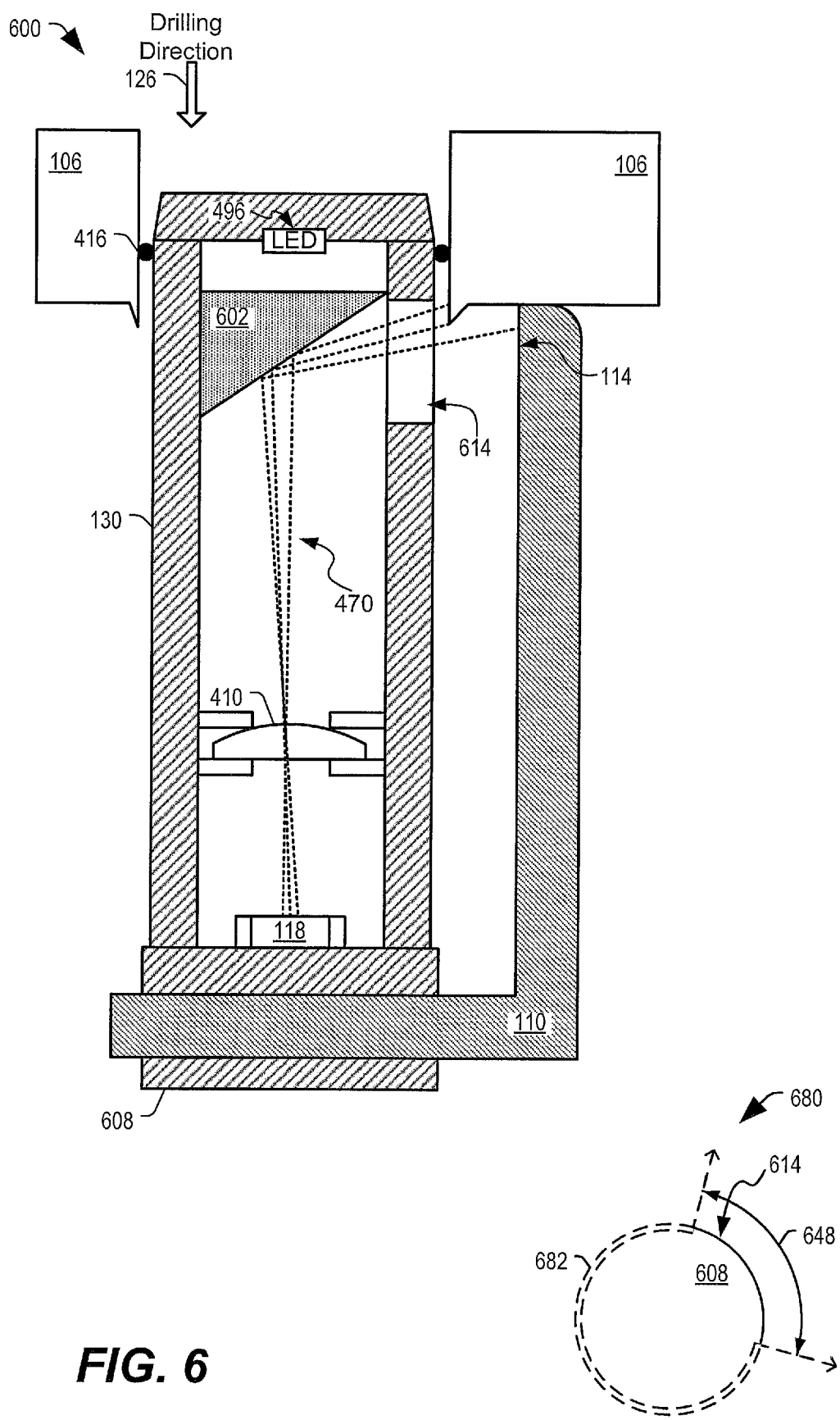
FIG. 6 is a diagram illustrating a fifth example of system for measuring an edge feature of a work piece.

The openings 414 allow light to pass from the clear portion 404 of the cone-shaped optical element 401 to the edge features and to at least a portion of the marked surface 114. Light reflected by the edge features and the marked surface 114 is reflected by the reflective surface 402 of the cone-shaped optical element 401, as illustrated by rays 470. In FIG. 4, the rays 470 pass through one or more lenses, such as the lens 410, and to the sensor 118. The sensor 118 is configured to capture an image representing a 360 degree field of view (either unimpeded or partially obscured by the support members 482) including the edge features and portions of the marked surface 114, as illustrated in FIG. 6.

In the example illustrated in FIG. 4, the opaque portion 406 of the cone-shaped optical element 401 is configured to inhibit light emitted by the light source 496 from propagating along a center line 420 of the optical sensor assembly 408 to the sensor 118, which could saturate the sensor 118 and reduce a quality of the image captured by the sensor 118. Additionally, a shade 412 may be coupled to or positioned proximate to the sensor 118. The shade 412 inhibits light from reaching the sensor 118. The shape, size and position of the shade 412 are selected based on optical characteristics of the optical sensor assembly 408. For example, in the system 400, the cone-shaped optical element 401 is configured to reflect an image to the sensor 118 in a ring (as described further with reference to FIG. 6). A central portion of the ring corresponds to the opaque portion 406 of the cone-shaped optical element 401 and does not correspond to an image reflected by the edge feature or the marked surface 114. However, light diffused from the clear portion 404 of the cone-shaped optical element 401 may reflect off of interior walls of the housing 130 to the sensor 118. Accordingly, the shade 412 may be positioned to reduce or prevent light not corresponding to one of the reflected rays 470 from reaching the sensor 118. Additionally, the annular shade 403 may be included at the interface of the opaque portion 406 and the clear portion 404 further preventing illumination photons emanating from the clear portion 404 from directly striking the sensor 118.

In a particular embodiment, dimensions of the optical sensor assembly 408 are selected to improve image quality of images captured by the sensor 118 and to facilitate determining edge feature measurements based on the images. Although FIG. 4 is not to scale, a number of dimensions are illustrated. Radial dimensions illustrated in FIG. 4 include a radius of a clear aperture of the reflective surface 402 (also referred to as radius mirror clear aperture (RMCA) 430). In the example illustrated in FIG. 4, the RMCA 430 corresponds to a distance from the center line 420 to an inner surface 422 of the housing 130. In other examples, the cone-shaped optical element 401 may be held in place by a retainer that obscures a portion of the reflective surface 402. In such examples, the RMCA 430 may be smaller than the distance from center line 420 to the inner surface 422 of the housing 130 by a width of the retainer.

The radial dimensions illustrated in FIG. 4 also include a minimum hole radius (also referred to as radius hole minimum (RHmin) 432). In the example illustrated in FIG. 4, the RHmin 432 corresponds to a distance from the center line 420 to an outer surface 424 of the housing 130. The radial dimensions illustrated in FIG. 4 also include a hole radius (also referred to as distance to object (DO) 434). In the example illustrated in FIG. 4, the DO 434 corresponds to a distance from the center line 420 to an inner surface 426 of the hole. Thus, the DO 434 may be greater than the RHmin 432 by an amount corresponding to a thickness of a spacer 416 used to facilitate centering the optical sensor assembly 408 in the hole. Although a single spacer 416 is illustrated in FIG. 4, more than one spacer 416 may be used in some implementations.

The radial dimensions illustrated in FIG. 4 also include a radius of the marked surface 114 (also referred to as radius envelope maximum (REmax) 436). In the example illustrated in FIG. 4, the REmax 436 corresponds to a distance from the center line 420 to an inner surface 428 of the reference device 110 (e.g., to the marked surface 114).

Length dimensions illustrated in FIG. 4 include a length 456 between a surface 448 of the sensor 118 and a plane 446 of the lens 410. The length dimensions illustrated in FIG. 4 also include a length 454 between the plane 446 of the lens 410 and a peak 444 of the cone-shaped optical element 401 (also referred to as a distance mirror tip to lens (DMTL). In some embodiments, the cone-shaped optical element 401 may be a partial cone. For example, the peak 444 may be rounded or flattened. In such embodiments, the length 454 may correspond to a distance between the plane 446 of the lens 410 and a location where the peak 444 of the cone-shaped optical element 401 would be if it were not rounded or flattened.

Length dimensions illustrated in FIG. 4 also include a length 452 between the peak 444 of the cone-shaped optical element 401 and a surface 442 of the work piece 106. The length 452 may also be referred to as height object (HO) 452. The length dimensions illustrated in FIG. 4 also include a length 458 between the contact surface of the reference device 110 (which is in contact with the surface 442 of the work piece 106 in FIG. 4) and second surface 450 of the reference device 110. Thus, the length 458 corresponds to a height of the reference device 110. The length dimensions illustrated in FIG. 4 also include a length 460 between the second surface 450 of the reference device 110 and an end 440 of the optical sensor assembly 408 when the optical sensor assembly 408 is seated in the reference device 110. Thus, a difference between the length 458 and the length 460 corresponds to depth of the end 440 in the hole when the optical sensor assembly 408 is seated in the reference device 110 and the contact surface of the reference device 110 is in contact with the surface 442 of the work piece 106.

The dimensions illustrated in FIG. 4 may be used (with other information such as a pixel size of the sensor 118) to calculate the height of an edge feature represented in an image captured by the sensor 118. For example, a size of an object within the HO 452 may be related to a size of the object (also referred to as height image (HI)) at the sensor 118 by Equation 1, $$HO = DI * \frac{HI}{(DMTL + DO)} \quad \text{(Equation 1)}$$

where HO is the size of an object (e.g., a size of an edge feature), DI is distance image, HI is the height image correspond to a height of an image of the object (e.g., a size of the edge features in the image) captured by the sensor 118, DMTL is the length 454, and DO is distance object (which may correspond to RHmin 432). DI can be calculate using Equation 2, $$DI = \left(\frac{1}{f} - \frac{1}{DO}\right)^{-1} \quad \text{(Equation 2)}$$

where f is the focal length of the lens 410. Thus, using the dimensions illustrated in FIG. 4, a size (HO) of an object can be calculated based on a size (HI) of the object in an image captured by the sensor 118. Additionally, the system 400 enables capturing a single image with a 360 degree field of view to measure edge features of the work piece. FIG. 6 illustrates a particular example of an image that may be captured by the system 400.

FIG. 5 is a diagram illustrating an example of system 500 for measuring an edge feature of the work piece 106. The system 500 includes the reference device 110 and an optical sensor assembly 508. The optical sensor assembly 508 of FIG. 5 is configured to be inserted into the work piece 106 from the front side of the work piece 106 relative to the drilling direction 126.

Like the optical sensor assembly 408 of FIG. 4, the optical sensor assembly 508 is configured to capture a single image with a 360 degree field of view (either unimpeded or partially obscured by support members, as illustrated in FIG. 4) of the edge features of the work piece 106. The optical sensor assembly 508 includes the sensor 118, the shade 412, the lens 410, the openings 414, the light source 496, and the spacers 416, which perform functions as described with reference to FIG. 4. The light source 496 includes a shade 512. Additionally, certain of the dimensions illustrated and described with reference to FIG. 4 are omitted from FIG. 5. For example, all of the radial dimensions are omitted since the radial dimensions of the system 400 are shared by the system 500. Certain of the length dimensions are illustrated in FIG. 5 to clarify how each of these length dimensions is defined for the system 500.

The optical sensor assembly 508 includes a first mirror corresponding to a reflective surface 502 of a hollow, truncated cone-shaped optical element 501 (also referred to as optical element 501). The optical sensor assembly 508 also includes a second mirror 504. A surface of the second mirror 504 is located where a peak of the optical element 501 would be if a cone shape of the optical element 501 were not truncated (e.g., at the peak 444). The optical element 501 has a hollow or transparent central region 506, which allows the rays 470 to project through the optical element 501 to the lens 410 and the sensor 118.

The height of an edge feature represented in an image captured by the sensor 118 of FIG. 5 can be calculated in the same manner as described with reference to FIG. 4, taking into account differences in how the various dimensions are determined. Thus, the system 500 enables capturing of a single image with a 360 degree field of view to measure edge features of the work piece. FIG. 6 illustrates a particular example of an image that may be captured by the system 500.

FIG. 6 is a diagram illustrating an example of a system 600 for measuring an edge feature of the work piece 106. The system 600 includes the reference device 110 and an optical sensor assembly 608. FIG. 6 also illustrates a plan view 680 of the optical sensor assembly 608. The optical sensor assembly 608 of FIG. 6 is configured to be inserted into the work piece 106 from the back side of the work piece 106 relative to the drilling direction 126.

The optical sensor assembly 608 is configured to capture an image with a limited field of view of the edge features of the work piece 106. For example, the optical sensor assembly 608 includes a single opening 614 through a wall 682 of the housing 130. The single opening 614 is configured to capture a field of view 648 less than 360 degrees.

The optical sensor assembly 608 includes the sensor 118, the lens 410, the light source 496, and the spacers 416, which perform functions as described with reference to FIG. 4. Additionally, the optical sensor assembly 608 includes a prism 602 or flat mirror to direct the rays 470 to the sensor 118. Thus, the system 600 enables capturing of images with less than a 360 degree field of view to measure edge features of the work piece 106. Multiple images may be captured using the system 600 to represent a full 360 degree field of view of the edge features.

Figure 7:
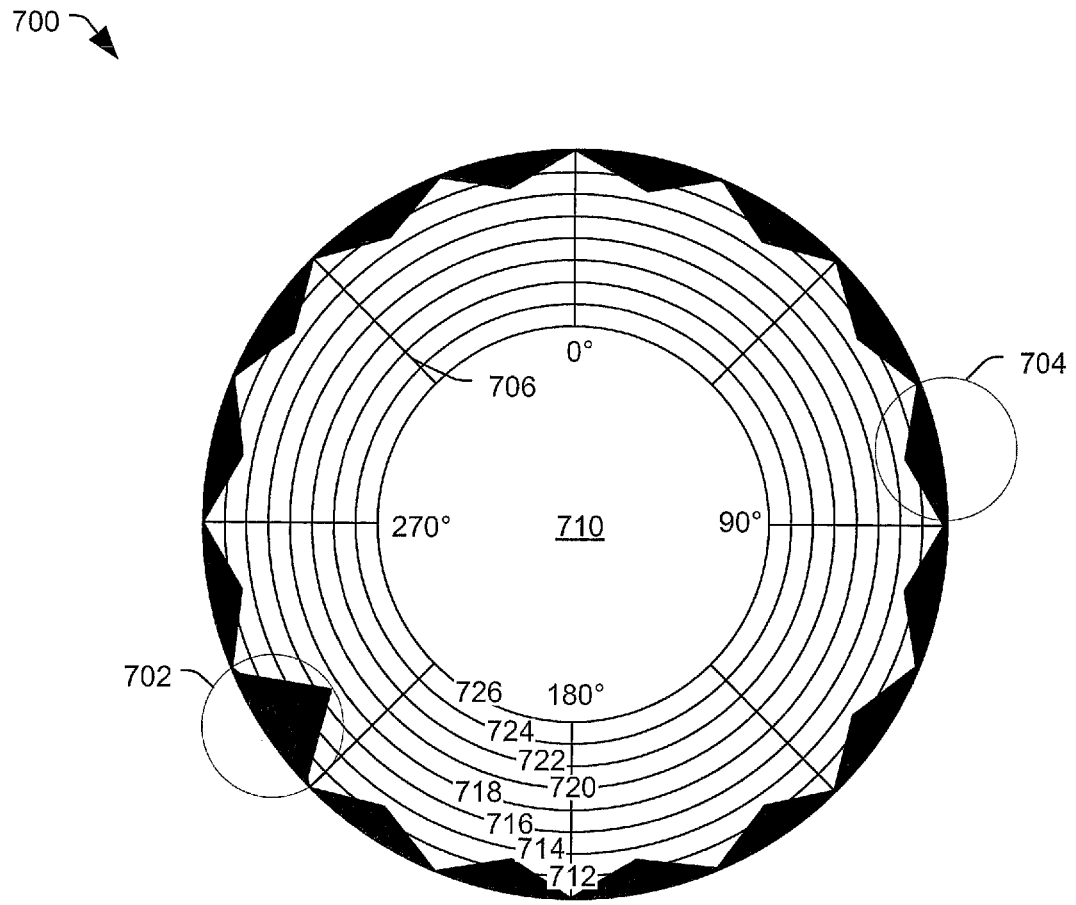
FIG. 7 is a diagram illustrating an image having a 360 degree field of view representing edge features of a work piece and reference markings.

FIG. 7 is a diagram illustrating an image 700 having a 360 degree field of view representing edge features of a work piece and reference markings. The image 700 may be captured using the system 400 of FIG. 4, using the system 500 of FIG. 5, or using the system 900 of FIG. 9.

Figure 9:
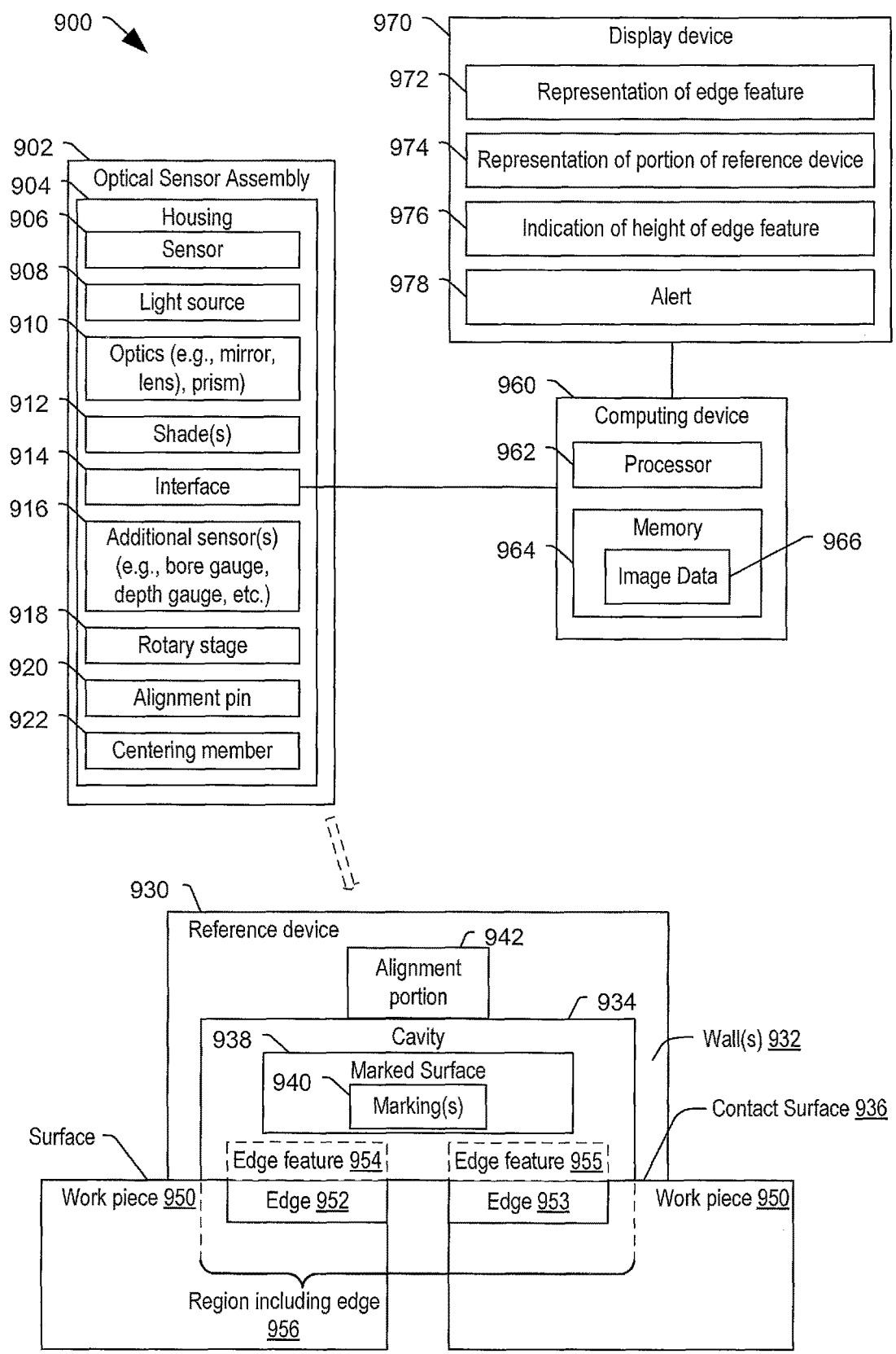
FIG. 9 is a block diagram illustrating an example of a system for measuring an edge feature of a work piece.

The image 700 includes a central region 710 that corresponds to a portion of a sensor obscured by a shade, such as the shade 412 of FIG. 4 or 5 or the shade 912 of FIG. 9. The image 700 includes angular annotations indicating angular positions relative to a reference angle (e.g., 0 degrees). For example, a first angular annotation 706 corresponds to an angle of 315 degrees relative to the reference angle. The image 700 includes radial annotations 712-726 indicating heights relative to a contact surface of a reference device, such as the reference device 110. The radial annotations 712-726, the angular annotations, or both, may correspond to markings on a marked surface of the reference device.

The image 700 also includes representations (illustrated as black triangles) of edge features around an edge of a hole in a work piece. For example, the image 700 includes a first representation 702 corresponding to an edge feature having a peak at approximately 235 degrees from a reference angle (e.g., 0 degrees). The image 700 also includes a second representation 704 corresponding to an edge feature having a peak at approximately 80 degrees from the reference angle. In the example illustrated in FIG. 7, a peak of the first edge feature 702 is taller than the second edge feature 704. For example, the peak of the first edge feature 702 is between radial annotation 716 and radial annotation 718; whereas, the peak of the second edge feature 704 is between radial annotation 712 and radial annotation 714.

Since the radial annotations 712-726 correspond to markings having a known scale (e.g., known spacing between markings and/or known distances from the contact surface) on the marked surface, the location of the peak of the first and second edge features 702, 704 relative to the radial annotations 712-726 can be used to determine the height of each of the first and second edge features 702, 704. Additionally or in the alternative, the height of each of the edge features may be determined based on optics of the optical sensor assembly used to capture the image 700 according to calculations described with reference to FIG. 4.

Thus, the image 700 can be used to measure edge feature in a manner that does not involve physical contact with the edge feature. Additionally, such measurements are repeatable since each measurement does not change the edge features. Further, the image 700 can be archived for later reference enabling simple archiving of data and measurements associated with edge feature measurements. The image 700 also be automatically analyzed to determine edge feature measurement values.

Figure 8:
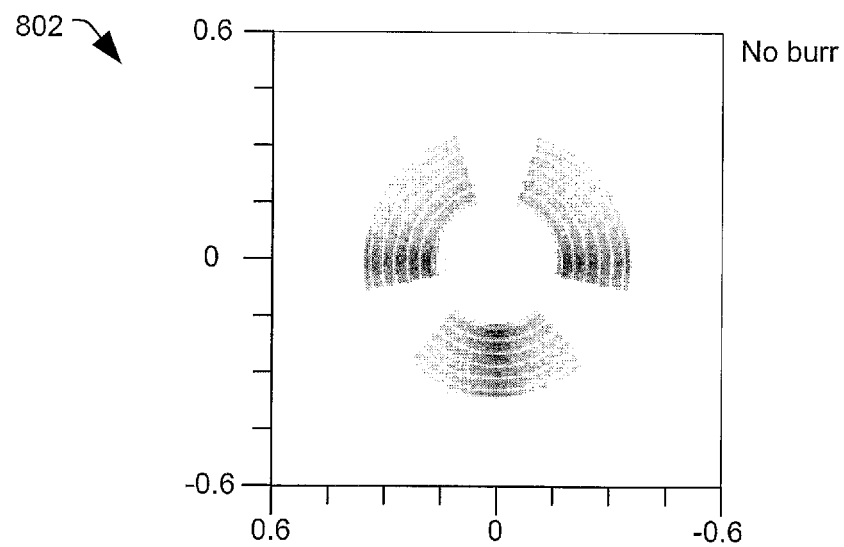
FIG. 8 is a diagram illustrating three images, each having a 360 degree field of view representing edge features of a work piece and reference markings.
Figure 8:
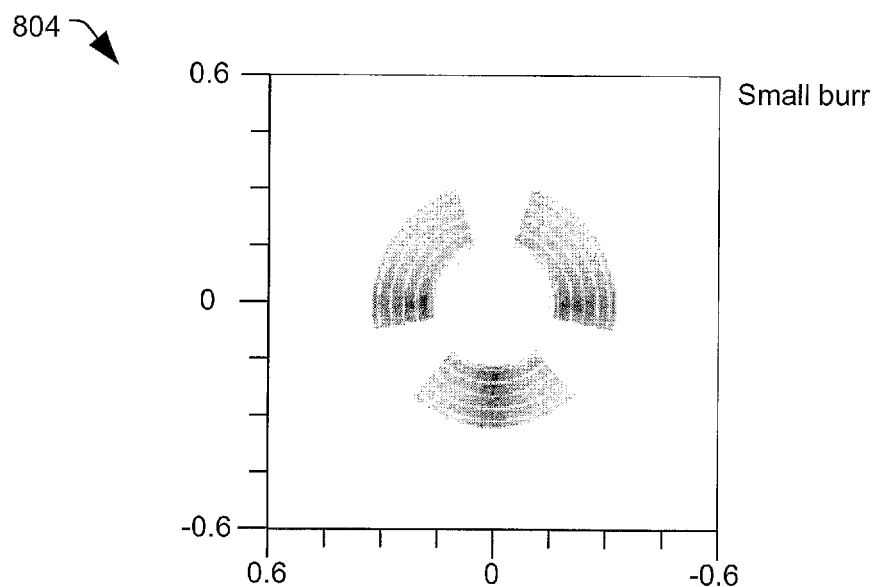
Figure 8:
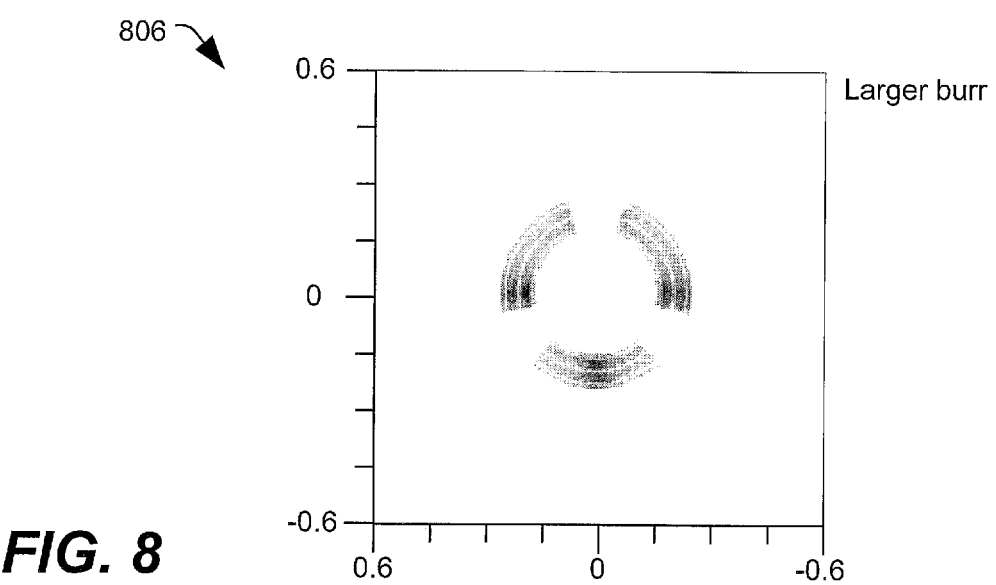

FIG. 8 is a diagram illustrating three images 802, 804, 806 representing edge features of a work piece and reference markings. Each of the images 802, 804, 806 has a 360 degree field of view that is partially obscured by support members, as described with reference to FIG. 4. For example, the images 802, 804, 806 may be captured using the system 400 of FIG. 4, using the system 500 of FIG. 5, or using the system 900 of FIG. 9.

Each of the images 802, 804, 806 includes a blank central region, which corresponds to the central region 710 of FIG. 7. Around the central region, each of the images 802, 804, 806 includes a set of concentric rings. In FIG. 8, the rings are spaced apart from one another radially by white regions which correspond to markings of a reference device, such as the reference device 110 of FIGS. 4 and 5, or the reference device 930 of FIG. 9. Additionally, segments of each ring are spaced apart from one another circumferentially by white regions which correspond to support members obscuring portions of the reference device.

The image 802 represents an edge without a burr (or other edge features). Accordingly, all of the markings of the reference device are visible (i.e., not obscured by edge features) in the image 802.

The image 804 represents an edge with a small burr (or other edge feature). Commonly, a burr produced by a drilling operation extends around the entire hole formed by the drilling operation. Accordingly, in the image 804, the burr obscures some of the marked surface of the reference device producing an image with a smaller diameter than the image 802 with no burr. The height of the burr of the image 804 can be determined based on which markings are obscured by the burr (or which marking are unobscured by the burr).

The image 806 represents an edge with a larger burr (or other edge feature) than the burr represented in the image 804. Since the burr of the image 806 is larger than the burr of the image 804, the burr of the image 806 obscures more of the marked surface of the reference device producing an image with a smaller diameter than the image 804. The height of the burr of the image 806 can be determined based on which markings are obscured by the burr (or which marking are unobscured by the burr).

Thus, one or more of the images 802, 804, 806 can be used to measure edges feature in a manner that does not involve physical contact with the edge features. Additionally, such measurements are repeatable since each measurement does not change the edge features. Further, the images 802, 804, 806 can be archived for later reference enabling simple archiving of data and measurements associated with edge feature measurements. The images 802, 804, 806 also be automatically analyzed to determine edge feature measurement values.

FIG. 9 is a block diagram illustrating a system 900 for measuring an edge feature 954 or edge features 954 and 955 of a work piece 950. The work piece 950 may include or correspond to the work piece 106 of FIG. 1, 2, 4, 5, or 6. The edge features 954, 955 may include or correspond to a burr, tear out, or another artifact of machining formed at an edge 952, 953 of the work piece 950.

The system 900 includes an optical sensor assembly 902 and a reference device 930. The optical sensor assembly 902 may include, be included within, or correspond to the optical sensor assembly 108 of FIG. 1, the optical sensor assembly 208 of FIG. 2, the optical sensor assembly 408 of FIG. 4, the optical sensor assembly 508 of FIG. 5, the optical sensor assembly 608 of FIG. 6, or another optical sensor assembly. The reference device 930 may include, be included within, or correspond to the reference device 110 of FIG. 1, the reference device 210 of FIG. 2, the reference device 300 of FIG. 3A, the reference device 350 of FIG. 3B, the reference device 110 of FIG. 4, the reference device 110 of FIG. 5, the reference device 110 of FIG. 6, or another reference device.

The system 900 may also include a computing device 960 and a display device 970. The computing device 960 may include, be included within, or correspond to the computing device 140 of FIG. 1, the computing device 1110 of FIG. 11, or another computing device. The display device 970 may include, be included within, or correspond to the display device 150 of FIG. 1, the display device 1192 of FIG. 11, or another display device.

The optical sensor assembly 902 includes a housing 904, such as the housing 130 of FIG. 1, the housing 230 of FIG. 2, the housing 130 of FIG. 4, the housing 130 of FIG. 5, or the housing 130 of FIG. 6. The housing 904 may be coupled to, enclose, or partially enclose other components of the optical sensor assembly 902. For example, the housing 904 may be coupled to, enclose, or partially enclose a sensor 906, a light source 908, optics 910, shades 912, an interface 914, additional sensors 916, a rotary stage 918, an alignment pin 920, a centering member 922, other components of the optical sensor assembly 902 (not shown), or a combination thereof.

The sensor 906 may be configured to capture image data. In various examples, the sensor 906 includes or corresponds to a complementary metal-oxide semiconductor (CMOS) image sensor, a semiconductor charge-coupled device (CCD) sensor, an N-type metal-oxide semiconductor (NMOS) image sensor, another optical image sensor, or a combination thereof. The sensor 906 may include, be included within, or correspond to the sensor 118 of FIG. 1, 2, 4, 5 or 6.

The light source 908 includes an illumination fiber, a light-emitting diode (LED), an incandescent or fluorescent light bulb, or another light source. The light source 908 may provide illumination to facilitate capturing image data using the sensor 906. For example, the light source 908 may include, be included within, or correspond to the illumination fiber 136 of FIG. 1, the light source 496 of FIGS. 4-6, another light source, or a combination thereof. In a particular embodiment, the light source 908 is a variable intensity light source.

The optics 910 direct light toward the sensor 906, filter or focus the light, or a combination thereof. To illustrate, the optics 910 may include one or more lenses, one or more flat or contoured mirrors, optical filters or apertures, or other optical devices. For example, the optics 910 may include, be included within, or correspond to the cone-shaped optical element 401, the reflective surface 402, the clear portion 404, or the lens 410 of FIG. 4; the hollow, truncated cone-shaped optical element 501, the reflective surface 502, the second mirror 504, or the lens 410 of FIG. 5; the prism 602, the lens 410 or the flat mirror of FIG. 6; other optical components, or a combination thereof.

The shade or shades 912 include opaque, semi-opaque or translucent components that are positioned to reduce or prevent light from propagating in a particular direction or to a particular location. To illustrate, the shades 912 may be sized, shaped and positioned to block some light from reaching the sensor 118. The shades 912 may include, be included within, or correspond to the opaque portion 406, the shade 412, or the annular shade 403 of FIG. 4; the shade 412 or the shade 512 of FIG. 5; another shade, opaque, semi-opaque or translucent component; or a combination thereof.

The interface 914 is configured to provide image data captured by the sensor 906 to the computing device 960 using digital or analog electrical signals, optical signals, other signals, or a combination thereof. The interface 914 is configured to operate according to a standardized or proprietary communication protocol. In a particular embodiment, the interface 914 may include, be included within, or correspond to the interface 138 of FIG. 1.

The additional sensors 916 may be configured to perform one or more other quality control measurements or tests while the optical sensor assembly 902 captures image data. The additional sensors 916 may include, for example, a bore gauge, a depth gauge, a bore roundness gauge, a mechanical sensor, an electrical sensor, an acoustic sensor or an optical sensor. To illustrate, the additional sensors 916 may include, be included within, or correspond to the bore gauge 132 of FIG. 1.

The rotary stage 918 includes a manual, mechanical or electromechanical system that facilitates rotating the optical sensor assembly 902 or a portion of the optical sensor assembly 902 to capture images of different edge features of the work piece 950. For example, after the optical sensor assembly 902 captures an image of the edge feature 954, the rotary stage 918 may be used to rotate the optical sensor assembly 902 to capture an image of the edge feature 955. If the optical sensor assembly 902 is configured to capture an image having a 360 degree field of view (either unobscured or partially obscured by support members), the rotary stage 918 may be omitted. Alternately, if the field of view is partially obscured by the support members, the rotary stage 918 may be used to rotate the optical sensor assembly 902 to capture an image corresponding to locations obscured in a previously captured image. The rotary stage 918 may include, be included within, or correspond to the rotary stage 160 of FIG. 1.

The alignment pin 920 is configured to engage an alignment portion 942 of the reference device 930. The alignment pin 920 and the alignment portion 942 of the reference device 930 may interact to cause the sensor 906 to be aligned with the edge 952, a surface of the work piece 950, a contact surface 936 of the reference device 930, a marking 940 of the reference device 930, or a combination thereof. The alignment pin 920 may include, be included within, or correspond to the alignment pin 252 of FIG. 2. The alignment portion 942 of the reference device 930 include, be included within, or correspond to the alignment portion 250 of FIG. 2 or the alignment portion 314 of FIGS. 3A and 3B.

The centering member 922 may be configured to facilitate centering the housing 904 within an opening in the work piece 950. For example, the centering member 922 may include, be included within, or correspond to the spacer 416 of FIGS. 4-6.

The reference device 930 includes one or more walls 932 defining a cavity 934. The walls 932 also define a contact surface 936 and a marked surface 938. The marked surface 938 includes a plurality of markings 940. In a particular embodiment, the cavity 934 is sized to enclose a region 956 of the work piece 950 including the edge 952 or edges 952, 953 of the work piece 950.

The computing device 960 includes a processor 962 and a memory 964 that is accessible to the processor 962. The processor 962 may be configured to execute instructions to generate output for the display device 970, to process image data 966 (e.g., to enhance contrast within an image or to perform feature detection), to determine measurements of edge features based on the image data 966, to compare measurements to one or more threshold (e.g., thresholds corresponding to quality metrics), to control the optical sensor assembly 902 or an automated system coupled to the optical sensor assembly 902 (such as a positioning robot), to control an intensity of the light source 908, to generate alerts, to process data from the additional sensors, to control the rotary stage 918, to control positioning of the reference device 930 (e.g., using a positioning robot), to control positioning of the work piece 950 (e.g., using a positioning device, such as multi-axis table), or to perform other operations associated with measuring the edge features 954, 955 of the work piece 950. The memory 964 may be configured to store the image data 966. Additionally, the memory 964 may store instructions that are executable by the processor 962 to perform one or more of the operations described above. For example, the processor 962 may include, be included within, or correspond to the processor 142 of FIG. 1, and the memory 964 may include, be included within, or correspond to the memory 144 of FIG. 1.

The processor 962 may cause information to be presented at the display device 970. For example, the display device 970 may render an image from the image data 966. The image may include a representation 972 of an edge feature 954, 955, a representation 974 of a portion of the reference device 930, an indication 976 of a height of the edge feature 954, 955, an alert 978, or a combination thereof. For example, the representation 972 of the edge feature 954, 955 may include, be included within, or correspond to the representation 152 of the edge features 104 of FIG. 1, the first representation 702 of the first edge feature of FIG. 7, the second representation 704 of the second edge feature of FIG. 7, a representation of the small burr or the larger burr of FIG. 8, another representation of an edge feature, or a combination thereof. Additionally, or in the alternative, the representation 974 of the portion of the reference device 930 may include, be included within, or correspond to the representation 154 of the markings 116 of FIG. 1, the first angular annotation 706 or one of the radial annotations 712-726 of FIG. 7, one or more of the segmented rings of FIG. 8, or a combination thereof. Additionally, or in the alternative, the indication 976 of the height of the edge feature 954, 955 may include, be included within, or correspond to the indication 156 of the height of the edge feature 104 of FIG. 1, one of the radial annotations 712-726 of FIG. 7, one or more of the segmented rings of FIG. 8, or a combination thereof.

Thus, the system 900 enables in situ measurement of edge features, such as the edge features 954, 955. The edge feature measurement can be displayed, compared to a threshold, or both. If the edge feature measurement fails to satisfy the quality metric, an operator or control system may be alerted.

Figure 10:
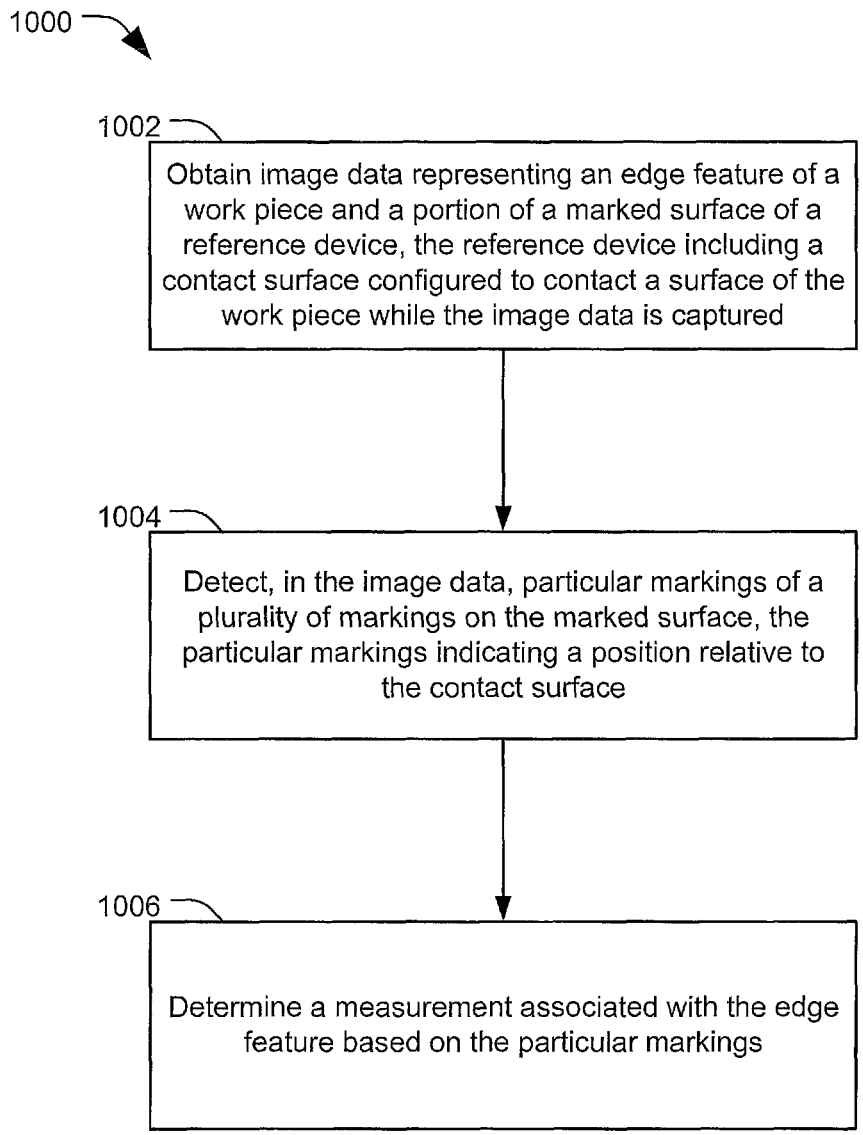
FIG. 10 is a flow chart illustrating a particular example of a method of measuring an edge feature of a work piece.

FIG. 10 is a flow chart illustrating a particular example of a method 1000 of measuring an edge feature of a work piece. The method 1000 includes, at 1002, obtaining image data representing the edge feature of the work piece and a portion of a marked surface of a reference device. For example, the edge feature may include or correspond to a burr of a hole in the work piece, or another artifact of machining the work piece. The image data may be obtained from an optical sensor assembly, such as one of the optical sensor assemblies 108, 208, 408, 508, 608, or 902 of FIGS. 1, 2, 4, 5, 6 and 9, respectively. For example, the method 1000 may include inserting at least a portion of the optical sensor assembly into a hole to obtain the image data. In some implementations, the optical sensor assembly may include or be coupled to a bore gauge (e.g., a bore diameter gauge, a bore shape gauge, or a bore depth gauge). In these implementations, the method 1000 may also include verifying a diameter of the hole concurrently with obtaining the image data. Alternately or in addition, the image data may be obtained from a memory, such as the memory 144 of FIG. 1 or the memory 964 of FIG. 9. The reference device includes a contact surface configured to contact a surface of the work piece while the image data is captured. For example, the reference device may correspond to or include one of the reference device 110, 210, 300, 350, 930 of FIGS. 1, 2, 3A, 3B, 4, 5, 6, and 9.

In some implementations, the image data represent a 360 degree field of view (which may be partially obscured by supporting members in some implementations) of the edge features at multiple angular positions on the work piece. In other implementations, the image data represent a field of view that is less than 360 degrees.

The method 1000 also includes, at 1004, detecting, in the image data, particular markings of a plurality of markings on the marked surface. The particular markings indicates a position relative to the contact surface. For example, the markings may include or correspond to the markings 116 of FIG. 1, the markings 306 of FIG. 3A, the markings 356 of FIG. 3B, or the markings 940 of FIG. 9. The markings may be represented in the image data by the representation 154 of the markings of FIG. 1, by the radial annotations 612-626 of FIG. 6, by the segmented rings of FIG. 8, or by the representation 974 of the portion of the reference device of FIG. 9.

The method 1000 also includes, at 1006, determining a measurement associated with the edge feature based on the particular markings. For example, a location of a peak of the edge feature as represented in the image data may be compared to one or more of the marking detected in the image data to determine the measurement associated with the edge feature. In this example, the location may correspond to a height of the peak, an angular position of the peak with respect to a reference angle, or both. As another, the edge feature may partially or complete obscure one or more of the markings, and the height of the edge feature may be determined based on which markings are obscured or which markings are not obscured.

The method 1000 may also include comparing the measurement associated with the edge feature to a threshold and generating an alert if the measurement associated with the edge feature exceeds the threshold. The method 1000 may further include generating a display including information indicating the measurement associated with the edge feature.

Figure 11:
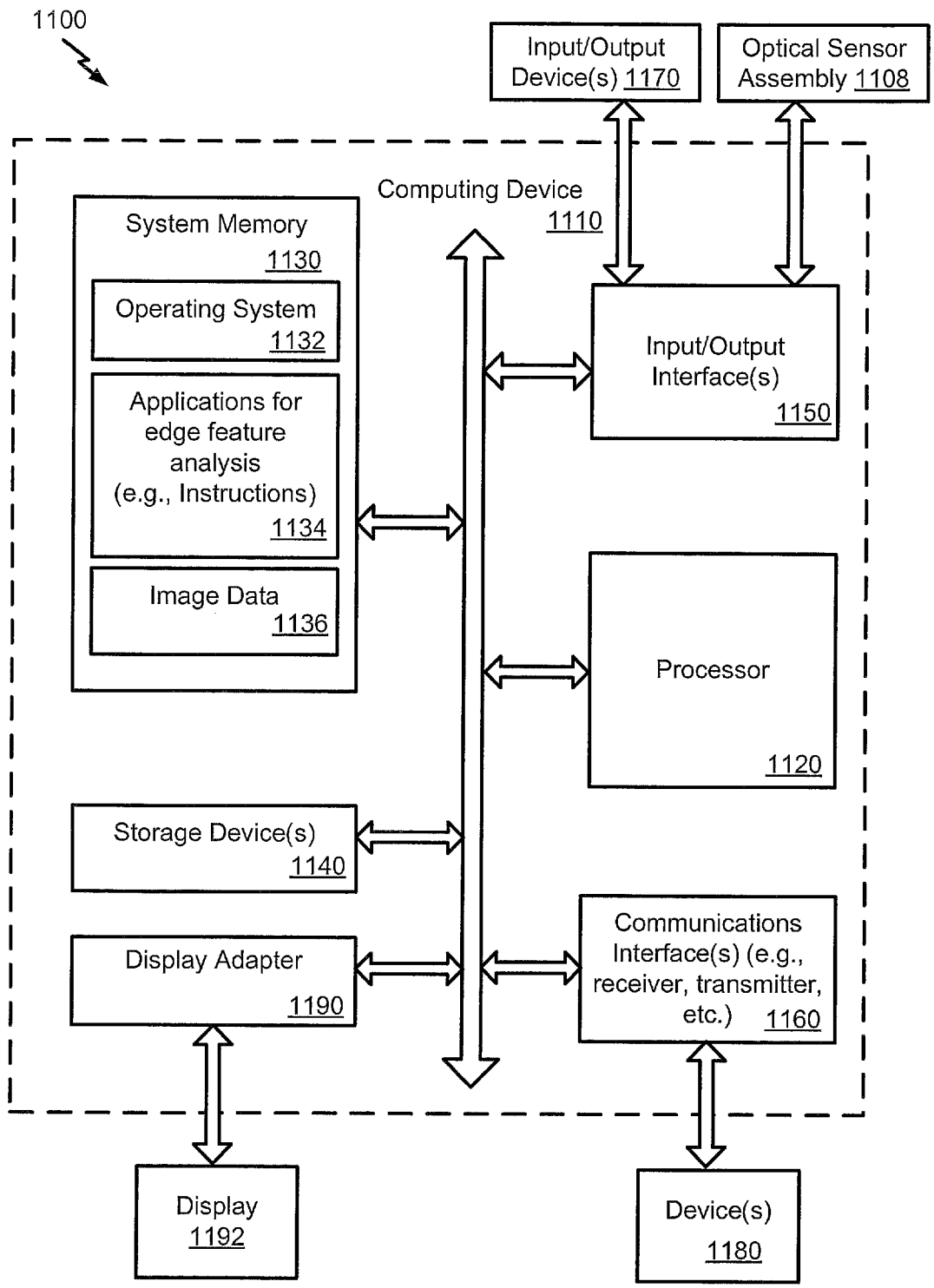
FIG. 11 is an illustration of a block diagram of a computing environment including a general purpose computing device configured to support measuring an edge feature of a work piece.

FIG. 11 is an illustration of a block diagram of a computing environment 1100 including a general purpose computing device 1110 configured to support embodiments of computer-implemented methods and computer-executable program instructions (or code) according to the present disclosure. For example, the computing device 1110, or portions thereof, may execute instructions to determine a measurement of an edge feature of a work piece based on image data. To illustrate, the computing device 1110 may include, be included within, or correspond to the computing device 140 of FIG. 1 or the computing device 960 of FIG. 9. Thus, the computing device 1110 may include an applications for edge feature analysis 1134, which may include, correspond to, or be included within the instructions 146 of FIG. 1. Additionally or in the alternative, the computing device 1110 may include image data 1136, which may include, correspond to, or be included within the image data 148 of FIG. 1 or the image data 966 of FIG. 9. The computing device 1110, or portions thereof, may further execute instructions according to any of the methods described herein. For example, the computing device 1110 may execute instructions according to the method 1000 of FIG. 10.

The computing device 1110 may include a processor 1120. The processor 1120 may communicate with a system memory 1130, one or more storage devices 1140, one or more input/output interfaces 1150, one or more communications interfaces 1160, or a combination thereof. The system memory 1130 may include volatile memory devices (e.g., random access memory (RAM) devices), nonvolatile memory devices (e.g., read-only memory (ROM) devices, programmable read-only memory, and flash memory), or both. The system memory 1130 may store data and instructions corresponding to an operating system 1132, which may include a basic/input output system for booting the computing device 1110 as well as a full operating system to enable the computing device 1110 to interact with users, other programs, and other devices. In addition to the applications for edge feature analysis 1134 and the image data 1136, the system memory 1130 may include one or more other applications which may be executable by the processor 1120.

The processor 1120 may also communicate with the one or more storage devices 1140. For example, the one or more storage devices 1140 may include nonvolatile storage devices, such as magnetic disks, optical disks, or flash memory devices. The storage devices 1140 may include both removable and non-removable memory devices. The storage devices 1140 may be configured to store an operating system, images of operating systems, applications, and program data. In a particular example, the storage device 1140 may be configured to store archived image data and/or measurement values associated with edge features. In a particular embodiment, the memory 1130, the storage devices 1140, or both, include tangible computer-readable media.

The processor 1120 may also communicate with one or more input/output interfaces 1150 that enable the computing device 1110 to communicate with one or more input/output devices 1170 to facilitate user interaction. As an example, the computing device 1110 receive image data from an optical sensor assembly 1108. The optical sensor assembly 1108 may include or correspond to one of the optical sensor assemblies 108, 208, 408, 508, 608 or 902 of FIGS. 1, 2, 4, 5, 6, and 9, respectively. The processor 1120 may also detect interaction events based on user input received via the input/output interfaces 1150.

The computing device 1110 may communicate with a display device 1192 to output images representing edge features, portions of a marked surface of a reference device, indications of edge feature measurements, alerts, etc. The processor 1120 may send a display to the display device 1192 via a display adapter 1190. The processor 1120 may communicate with other devices 1180 (such as other computing devices) via one or more communications interfaces 1160.

Embodiments described above are illustrative and do not limit the disclosure. It is to be understood that numerous modifications and variations are possible in accordance with the principles of the present disclosure.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. Accordingly, the disclosure and the figures are to be regarded as illustrative rather than restrictive.

Moreover, although specific embodiments have been illustrated and described herein, any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. An apparatus for measuring edge features of a work piece, the apparatus comprising:
   an optical sensor assembly including:
      an optical sensor configured to capture an image; and
      a housing coupled to the optical sensor, the housing comprising an alignment portion positioned along the housing such that, when the alignment portion contacts an alignment surface of a reference device, a surface of the work piece, an edge feature of the work piece, and a portion of a marked surface of the reference device are within a focal area of the optical sensor; and
   the reference device having one or more walls that define a cavity within the reference device, the reference device including:
      a contact surface around a perimeter of the cavity, the contact surface configured to contact the surface of the work piece adjacent to an edge of the work piece; and
      the marked surface within the cavity on a wall of the one or more walls that define the cavity, the marked surface including a plurality of markings indicating distances to the contact surface.

2. The apparatus of claim 1, further comprising a rotary stage configured to rotate at least a portion of the optical sensor assembly to capture images representing the edge features at multiple angular positions on the work piece.

3. The apparatus of claim 1, wherein the optical sensor assembly is configured to capture a single image that includes a 360 degree field of view of an inner surface of the reference device, and that represents the edge features at multiple angular positions on the work piece.

4. The apparatus of claim 1, wherein the cavity is sized to enclose a region of the work piece that includes the edge of the work piece.

5. The apparatus of claim 4, wherein the region includes a hole in the work piece, and one or more walls are dimensioned to enclose the hole at a distance sufficient to avoid contact between the reference device and the edge features.

6. The apparatus of claim 1, wherein the portion of the reference device in the focal area includes the plurality of markings such that the image represents a height of the edge feature of the work piece relative to the contact surface based on the plurality of markings.

7. The apparatus of claim 1, wherein the plurality of markings further indicate angular positions around the marked surface.

8. The apparatus of claim 1, wherein the edge feature of the work piece corresponds to a burr, a tear out, or a combination thereof.

9. The apparatus of claim 1, wherein the optical sensor assembly further includes a light source.

10. The apparatus of claim 1, wherein the optical sensor assembly further includes:
   a light source;
   one or more mirrors configured to received light emitted from the light source and the light reflected by the edge feature; and
   one or more lenses configured to modify an optical path of and to focus the light emitted from the light source, wherein the one or more mirrors and the one or more lenses are positioned within the housing and along an optical path of the optical sensor.

11. The apparatus of claim 1, wherein the optical sensor assembly includes an interface to provide image data corresponding to the image to a computing device.

12. The apparatus of claim 1, further comprising a bore diameter gauge coupled to the optical sensor assembly.

13. The apparatus of claim 1, further comprising a guide coupled to the housing of the optical sensor assembly to center the housing in a hole in the work piece.

14. A reference device for measuring edge features of a work piece, the reference device comprising:
  one or more walls bounding a cavity and including a contact surface of the one or more walls, the contact surface around a perimeter of the cavity, the contact surface configured to contact a surface of the work piece adjacent to an edge of the work piece;
  a marked surface on at least one wall of the one or more walls within the cavity, the marked surface including a plurality of markings indicating distances to the contact surface; and
  an alignment surface, the alignment surface configured to contact an alignment portion of a housing of an optical sensor assembly such that, when the alignment surface contacts the alignment portion of the housing, the surface of the work piece, an edge feature of the work piece, and a portion of the marked surface are within a focal area of an optical sensor of the optical sensor assembly.

15. The reference device of claim 14, wherein the plurality of markings are formed on a marked layer that is affixed to the marked surface.

16. A method of measuring an edge feature of a work piece, the method comprising:
  aligning a surface of a work piece, an edge feature of the work piece, and a portion of a marked surface of a reference device within a focal area of an optical sensor by contacting an alignment portion of a housing of an optical sensor assembly and the alignment portion of the reference device, the reference device distinct from the work piece and distinct from the optical sensor assembly;
  obtaining image data representing the edge feature of the work piece and the portion of the marked surface of the reference device;
  detecting, in the image data, particular markings of a plurality of markings on the marked surface, the particular markings indicating distances to a contact surface of the reference device; and
  determining a measurement associated with the edge feature based on the particular markings.

17. The method of claim 16, wherein obtaining the image data includes receiving the image data from the optical sensor assembly while the optical sensor assembly is in contact with the reference device.

18. The method of claim 16, wherein the image data represents a 360 degree field of view of the edge features at multiple angular positions on the work piece.

19. The method of claim 16, further comprising measuring a diameter of a hole concurrently with obtaining the image data, wherein the hole defines an edge associated with the edge feature.

20. The method of claim 16, further comprising inserting at least a portion of an optical sensor assembly into a hole to obtain the image data, wherein the hole defines an edge associated with the edge feature.

21. The method of claim 16, further comprising comparing the measurement associated with the edge feature to a threshold and generating an alert if the measurement associated with the edge feature exceeds the threshold.

22. The method of claim 16, further comprising generating a display including information indicating the measurement associated with the edge feature.

* * * * *